US009808714B2

(12) United States Patent
Walker (10) Patent No.: US 9,808,714 B2
(45) Date of Patent: *Nov. 7, 2017

(54) NETWORK ENABLED GAME CONTROLLER

(71) Applicant: ELBO INC., Grapevine, TX (US)

(72) Inventor: Peter Anthony Walker, Cedar Park, TX (US)

(73) Assignee: ELBO INC., Grapevine, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/667,180

(22) Filed: Mar. 24, 2015

(65) Prior Publication Data

US 2016/0038834 A1  Feb. 11, 2016

Related U.S. Application Data

(63) Continuation of application No. 13/716,019, filed on Dec. 14, 2012, now Pat. No. 8,998,719.

(51) Int. Cl.
| | | |
|---|---|---|
| G07F 17/00 | (2006.01) | |
| A63F 13/31 | (2014.01) | |
| A63F 13/355 | (2014.01) | |
| A63F 13/22 | (2014.01) | |
| A63F 13/48 | (2014.01) | |
| A63F 13/77 | (2014.01) | |
| A63F 13/235 | (2014.01) | |
| A63F 13/73 | (2014.01) | |

(52) U.S. Cl.
CPC ............. *A63F 13/31* (2014.09); *A63F 13/22* (2014.09); *A63F 13/235* (2014.09); *A63F 13/355* (2014.09); *A63F 13/48* (2014.09); *A63F 13/73* (2014.09); *A63F 13/77* (2014.09)

(58) Field of Classification Search
CPC ...................................................... A63F 13/355
USPC ......................................... 463/40–42; 725/13
See application file for complete search history.

(56) References Cited

U.S. PATENT DOCUMENTS

| | | |
|---|---|---|
| 5,558,339 A | 9/1996 | Perlman |
| 5,586,257 A | 12/1996 | Perlman |
| 5,779,549 A | 7/1998 | Walker et al. |
| 5,890,963 A | 4/1999 | Yen |

(Continued)

OTHER PUBLICATIONS

GameSpy—Arcade for the Internet Subscription, 1996-2005.

(Continued)

*Primary Examiner* — David L Lewis
*Assistant Examiner* — Ross Williams
(74) *Attorney, Agent, or Firm* — Knobbe, Martens, Olson & Bear LLP (57) ABSTRACT

Aspects of the present disclosure relate to the implementation of a gaming environment including gaming servers for instantiating instances of games requested by a user. The gaming environment includes a game device for obtaining game inputs corresponding to the instantiated game. Additionally, the gaming environment includes one or more output devices for obtaining outputs generated by the processing of the inputs by the gaming server. Illustratively, the game device and one or more output devices form game device groups. Within each game device group, the inputs obtained by game device are transmitted independent of the outputs transmitted to the output devices. The transmission of input data from the game device and the transmission of the output audio data, output video data or other data from the gaming server may be individually optimized.

12 Claims, 11 Drawing Sheets

(56) References Cited

U.S. PATENT DOCUMENTS

| | | |
|---|---|---|
| 5,956,485 A | 9/1999 | Perlman |
| 6,025,801 A | 2/2000 | Beitel |
| 6,026,079 A | 2/2000 | Perlman |
| 6,029,046 A | 2/2000 | Khan et al. |
| 6,224,486 B1 | 5/2001 | Walker et al. |
| 6,315,668 B1 | 11/2001 | Metke et al. |
| 6,343,990 B1 | 2/2002 | Rasmussen et al. |
| 6,409,602 B1 | 6/2002 | Wiltshire et al. |
| 6,425,828 B2 | 7/2002 | Walker et al. |
| 6,468,160 B2 | 10/2002 | Eliott |
| 6,475,090 B2 | 11/2002 | Roelofs |
| 6,557,041 B2 | 4/2003 | Mallart |
| 6,665,872 B1 | 12/2003 | Krishnamurthy et al. |
| 6,716,102 B2 | 4/2004 | Whitten et al. |
| 6,810,528 B1 | 10/2004 | Chatani |
| 6,817,947 B2 | 11/2004 | Tanskanen |
| 6,878,067 B2 | 4/2005 | Blanco |
| 6,884,171 B2 | 4/2005 | Eck et al. |
| 6,908,389 B1 | 6/2005 | Puskala |
| 6,917,984 B1 | 7/2005 | Tan |
| 6,918,113 B2 | 7/2005 | Patel et al. |
| 6,959,320 B2 | 10/2005 | Shah et al. |
| 6,981,918 B2 | 1/2006 | Blanco |
| 7,031,473 B2 | 4/2006 | Morais et al. |
| 7,043,524 B2 | 5/2006 | Shah et al. |
| 7,062,567 B2 | 6/2006 | Benitez et al. |
| 7,090,582 B2 | 8/2006 | Danieli et al. |
| 7,189,161 B1 | 3/2007 | Wiltshire et al. |
| 7,209,874 B2 | 4/2007 | Salmonsen |
| 7,215,660 B2 | 5/2007 | Perlman |
| 7,218,739 B2 | 5/2007 | Multerer et al. |
| 7,266,509 B2 | 9/2007 | Koenig |
| 7,285,047 B2 | 10/2007 | Gelb et al. |
| 7,288,028 B2 | 10/2007 | Rodriquez et al. |
| 7,297,062 B2 | 11/2007 | Gatto et al. |
| 7,311,598 B2 | 12/2007 | Kaminkow et al. |
| 7,311,608 B1 | 12/2007 | Danieli et al. |
| 7,354,345 B2 | 4/2008 | Bortnik et al. |
| 7,458,894 B2 | 12/2008 | Danieli et al. |
| 7,471,665 B2 | 12/2008 | Perlman |
| 7,493,078 B2 | 2/2009 | Perlman |
| 7,500,916 B2 | 3/2009 | Lieberman et al. |
| 7,512,235 B2 | 3/2009 | Multerer et al. |
| 7,558,525 B2 | 7/2009 | Perlman |
| 7,559,834 B1 | 7/2009 | York |
| 7,567,293 B2 | 7/2009 | Perlman et al. |
| 7,567,527 B2 | 7/2009 | Perlman |
| 7,584,154 B1 | 9/2009 | Chen et al. |
| 7,590,084 B2 | 9/2009 | Perlman |
| 7,593,361 B2 | 9/2009 | Perlman |
| 7,605,861 B2 | 10/2009 | LaSalle et al. |
| 7,628,702 B2 | 12/2009 | Scallie |
| 7,633,521 B2 | 12/2009 | Perlman et al. |
| 7,663,045 B2 | 2/2010 | Schmidt et al. |
| 7,667,767 B2 | 2/2010 | Perlman |
| 7,670,220 B2 | 3/2010 | Chudley et al. |
| 7,684,752 B2 | 3/2010 | Perlman |
| 7,715,336 B2 | 5/2010 | Perlman |
| 7,736,231 B2 | 6/2010 | Evans et al. |
| 7,762,885 B2 | 7/2010 | Kelly et al. |
| 7,765,401 B2 | 7/2010 | Multerer et al. |
| 7,771,280 B2 | 8/2010 | Yoshino et al. |
| 7,785,197 B2 | 8/2010 | Smith |
| 7,789,757 B2 | 9/2010 | Gemelos et al. |
| 7,794,325 B2 | 9/2010 | Hawkins et al. |
| 7,803,048 B2 | 9/2010 | Tilston et al. |
| 7,811,174 B2 | 10/2010 | Whitten et al. |
| 7,818,568 B2 | 10/2010 | Multerer et al. |
| 7,824,268 B2 | 11/2010 | Harvey et al. |
| 7,837,558 B2 | 11/2010 | Yoshino et al. |
| 7,837,560 B2 | 11/2010 | Wiltshire et al. |
| 7,841,946 B2 | 11/2010 | Walker et al. |
| 7,846,025 B2 | 12/2010 | Whitten et al. |
| 7,849,491 B2 | 12/2010 | Perlman |
| 7,878,907 B2 | 2/2011 | Davis et al. |
| 7,878,908 B2 | 2/2011 | Sloate et al. |
| 7,887,418 B2 | 2/2011 | Kaminagayoshi |
| 7,887,420 B2 | 2/2011 | Nguyen et al. |
| 7,916,147 B2 | 3/2011 | Clemie et al. |
| 7,991,890 B2 | 8/2011 | Schmidt et al. |
| 8,002,617 B1 | 8/2011 | Uskela et al. |
| 8,038,535 B2 | 10/2011 | Jensen |
| 8,118,676 B2 | 2/2012 | Craig et al. |
| 2001/0016519 A1 | 8/2001 | Choe |
| 2001/0035859 A1 | 11/2001 | Kiser et al. |
| 2002/0022516 A1 | 2/2002 | Forden |
| 2002/0022521 A1 | 2/2002 | Idaka |
| 2002/0045484 A1 | 4/2002 | Eck et al. |
| 2002/0086730 A1 | 7/2002 | Nakai |
| 2002/0151363 A1 | 10/2002 | Letovsky et al. |
| 2002/0155891 A1 | 10/2002 | Okada et al. |
| 2003/0004882 A1 | 1/2003 | Holler et al. |
| 2003/0064808 A1 | 4/2003 | Hecht et al. |
| 2004/0038740 A1 | 2/2004 | Muir |
| 2004/0109031 A1 | 6/2004 | Deaton et al. |
| 2004/0110468 A1 | 6/2004 | Perlman |
| 2004/0127272 A1 | 7/2004 | Park et al. |
| 2004/0246936 A1 | 12/2004 | Perlman |
| 2004/0266529 A1 | 12/2004 | Chatani |
| 2005/0021159 A1 | 1/2005 | Ogawa |
| 2005/0070359 A1 | 3/2005 | Rodriquez et al. |
| 2005/0073968 A1 | 4/2005 | Perlman |
| 2005/0176452 A1 | 8/2005 | Perlman |
| 2005/0231469 A1 | 10/2005 | Wittig |
| 2006/0055699 A1 | 3/2006 | Perlman et al. |
| 2006/0055706 A1 | 3/2006 | Perlman et al. |
| 2006/0068911 A1 | 3/2006 | Pirich et al. |
| 2006/0112176 A1 | 5/2006 | Liu et al. |
| 2007/0021213 A1 | 1/2007 | Foe et al. |
| 2007/0091178 A1 | 4/2007 | Cotter et al. |
| 2007/0173325 A1 | 7/2007 | Shaw et al. |
| 2007/0184903 A1 | 8/2007 | Liu et al. |
| 2007/0238528 A1 | 10/2007 | Harris et al. |
| 2008/0119290 A1 | 5/2008 | Lee et al. |
| 2008/0125226 A1 | 5/2008 | Emmerson |
| 2008/0178298 A1 | 7/2008 | Arai et al. |
| 2008/0267069 A1 | 10/2008 | Thielman et al. |
| 2011/0045913 A1 | 2/2011 | Walker et al. |
| 2012/0157205 A9 | 6/2012 | Danieli et al. |
| 2012/0242590 A1 | 9/2012 | Baccichet et al. |

OTHER PUBLICATIONS

Henders, Tristan, "Latency and User Behaviour on a Multiplayer Game Server", 2001, Springer-Verlag.

Henderson, Tristan, "Observations on game server discovery mechanisms", Apr. 17, 2002, NetGames 2002.

IGN—The Xbox Live FAQ, http://www.ign.com/articles/2002/08/16/the-xbox-live-faq by Aaron Boulding, Aug 12, 2002.

IGN—Xbox 360 Launch Guide: Beyond the Launch, http://www.ign.com/articles/2005/12/01/xbox-360-launch-guide-beyond-the-launch by Douglass C. Perry, Nov. 30, 2005.

Product updates regarding XBOX and XBOX Live, http://www.engadget.com/tag/xbox+live+dashboard+update/ (2009).

Steam Subscription Service, 2006 Valve Corporation.

Verizon Open Whole New Virtual World of Online Games, Sep. 13, 2005.

youtube—"How to get started on Xbox live", https://www.youtube.com/watch?v=Lz_poqdtVnM, uploaded by videotechnology on Apr. 6, 2011.

"Zoo Tycoon", Nov. 25, 2001, available at <http://web.archive.org/web/20011226173527/www.pibweb.com/review/zooty-coon.html>.

NETWORK ENABLED GAME CONTROLLER

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

Generally described, typical gaming consoles are hardware components designed to execute software commands, obtain inputs from one or more controllers, and generate output in the form of audio and video signals. Users generally play console gaming consoles having access to a physical gaming console and providing inputs via a gaming controller connected to the gaming console. For example, a gaming console may be associated with one or more gaming controllers that can be connected to the gaming console via a wired connection, a short range wireless connection or a combination thereof. Likewise, the outputs generated by the gaming console are generally limited to any output devices, such as television, speakers, audio equipment, connected to the gaming console.

In some embodiments, portions of the execution of the gaming software commands may be executed on a remote computing device. In these embodiments, a gaming server or similar component receives inputs from a physical gaming console via a network connection. The gaming server processes the input and generates gaming device outputs, which are transmitted via the network connection back to the physical gaming console. As in the local embodiment described above, the physical gaming console receives inputs from game controllers connected locally to the physical gaming console. Likewise, the outputs generated by the gaming server are processed and transmitted through the physical gaming console to any output devices in communication with the physical gaming console.

BRIEF DESCRIPTION OF THE DRAWINGS

The foregoing aspects and many of the attendant advantages will become more readily appreciated as the same become better understood by reference to the following detailed description, when taken in conjunction with the accompanying drawings, wherein.

DETAILED DESCRIPTION

Generally, the present disclosure relates to a gaming environment. More specifically, aspects of the present disclosure relate to the implementation of a gaming environment including gaming servers for instantiating instances of games requested by a user. The gaming environment includes a game device for obtaining game inputs corresponding to the instantiated game. Additionally, the gaming environment includes one or more output devices for obtaining outputs generated by the processing of the inputs by the gaming server. Illustratively, the game device and one or more output devices form game device groups. Within each game device group, the inputs obtained by game device are transmitted independent of the outputs transmitted to the output devices. In some embodiments, the transmission of input data from the game device and the transmission of the output audio data, output video data or other data from the gaming server may be individually optimized. Additionally, the configuration of the game device group may be dynamically modified according the preset configurations/criteria set by the provider of the game, the user or upon receipt of a request/command.

Figure 1:
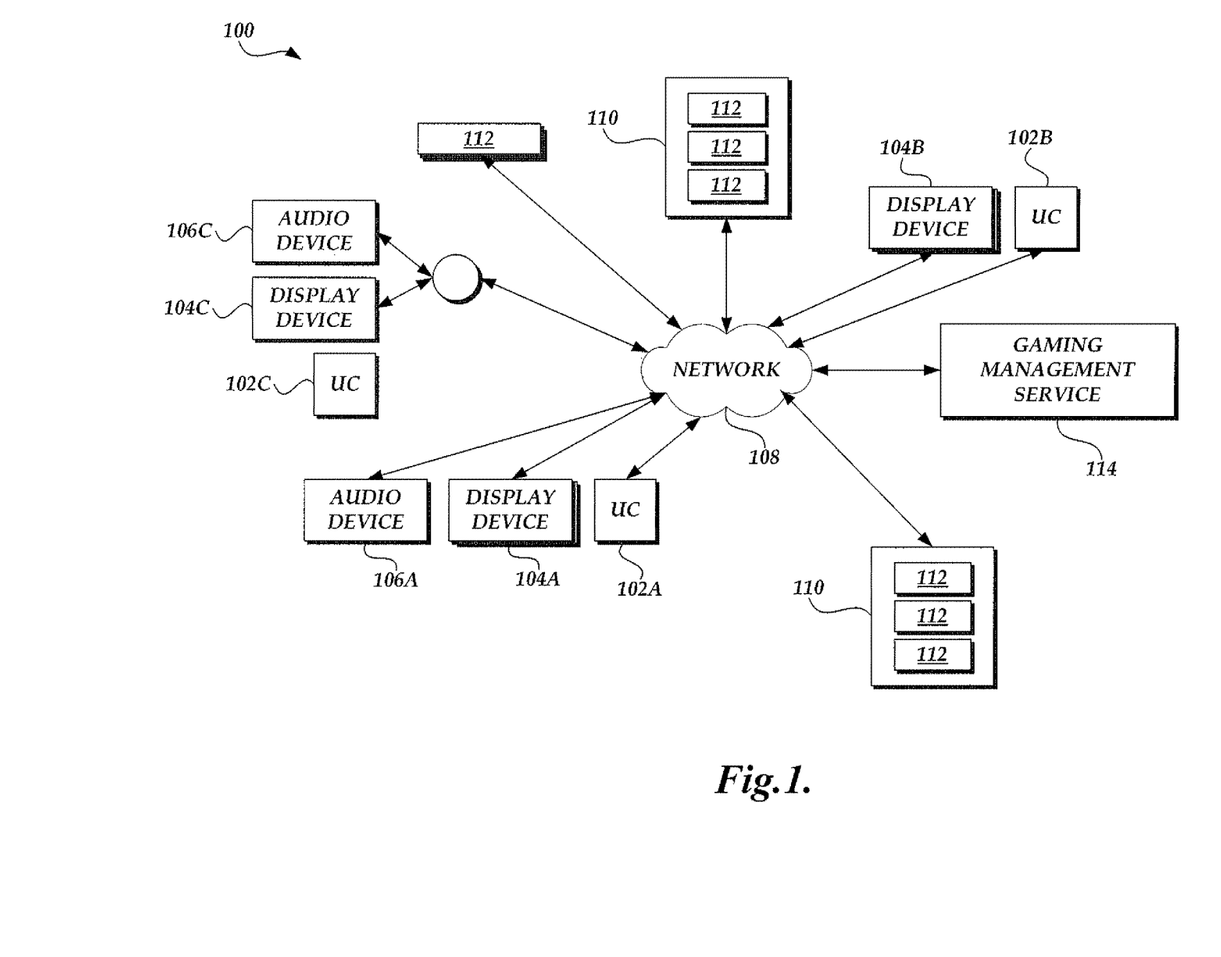
FIG. 1 is a block diagram illustrative of a gaming environment including a plurality of gaming servers, a plurality of audio devices, display devices and game device forming one or more gaming device groups, and a gaming management service.

With reference to FIG. 1, a gaming device 100 can include a set of gaming devices, or gaming controllers 102. The gaming devices 102 can be associated with one or more users. Illustratively, the gaming devices 102 can include various embodiments of hardware or software components for obtaining inputs provided by a user for use in conjunction with the configuration of the game device, game device groups and for execution of games hosted by the gaming environment. Illustrative components of a game device 102 will be described with regard to FIG. 2B. In conjunction with the game devices 102, the gaming environment 100 includes a number of displays devices 104 for displaying outputs generated in accordance with the execution of gaming software commands. Similarly, the gaming environment 100 includes a number of audio devices 106 for rendering audio outputs generated in accordance with the execution of gaming software commands. Although the present disclosure illustratively discloses the processing of audio and video outputs, one skilled in the relevant art will appreciate that additional or alternative forms of outputs and output devices, such as force feedback, may be incorporated in the gaming environment 100. Thus, the examples should not be viewed as limiting. As will be explained in detail below, one or more game devices 102 and one or more output devices, such as display devices 104 and audio devices 106, form the basis of a game device group.

As illustrative in FIG. 1, the game devices 102, display devices 104 and audio devices 106 can establish communications via communication network 108, either directly or indirectly. The communication network 108 can correspond to a private network, public network or collection of networks. Illustratively, the game devices 102, display devices 104 and audio devices 106 can each include one or more components and software code for communicating with the other devices via the communication network 108. One skilled in the relevant art will appreciate that various other hardware or software components may be utilized to facilitate the exchange data such as wired or wireless components (e.g., routers), mobile or Internet service providers, and the like. Additionally, one or more of the components such as the game device may function as a proxy that allows other devices to establish communications with the communication network. Still further, the game devices 102, display devices 104 and audio devices 106 may have optimized or dedicated communication channels for transmission of the respective data to and from the game devices 102, display devices 104 and audio devices 106. Alternatively, communications from the game devices 102, display devices 104 and audio devices 106 may be transmitted via common communication channels.

With continued reference to FIG. 1, the gaming environment 100 can include a number of gaming servers 112 for processing inputs from game devices 102, executing gaming software code to process the inputs and generating one or more outputs to display devices 104 and audio devices 106 via the communication network. In one embodiment, the gaming server 112 may corresponds to a virtualized instance of a gaming server hosted on one or more physical computing devices 110. In this embodiment, each gaming server instance 112 may be optimized based on organizational criteria, such as per customer or other criteria. In an alternative embodiment, instances of the gaming servers 112 may be instantiated based on actual or anticipated volume of requests. In other embodiments, the gaming servers 112 may be physical computing devices hosting a single instance of a gaming server.

The gaming environment can further include a gaming management service 114 for processing game device group registration information from users, gaming server registrations and facilitating the instantiation of gaming sessions between a gaming server and a game device group. In some embodiments, the gaming management service 114 may further facilitate the processing of some aspects of the communications between an instance of a gaming server 112 and a game device group 102, 104, 106. Although the gaming management service 114 is illustrated as a single component in FIG. 1, one skilled in the relevant art will appreciate that the gaming management service 114 can corresponds to any one of a number of physical or virtual components for utilization in the functionality associated with the gaming management service 114.

Figure 2A:
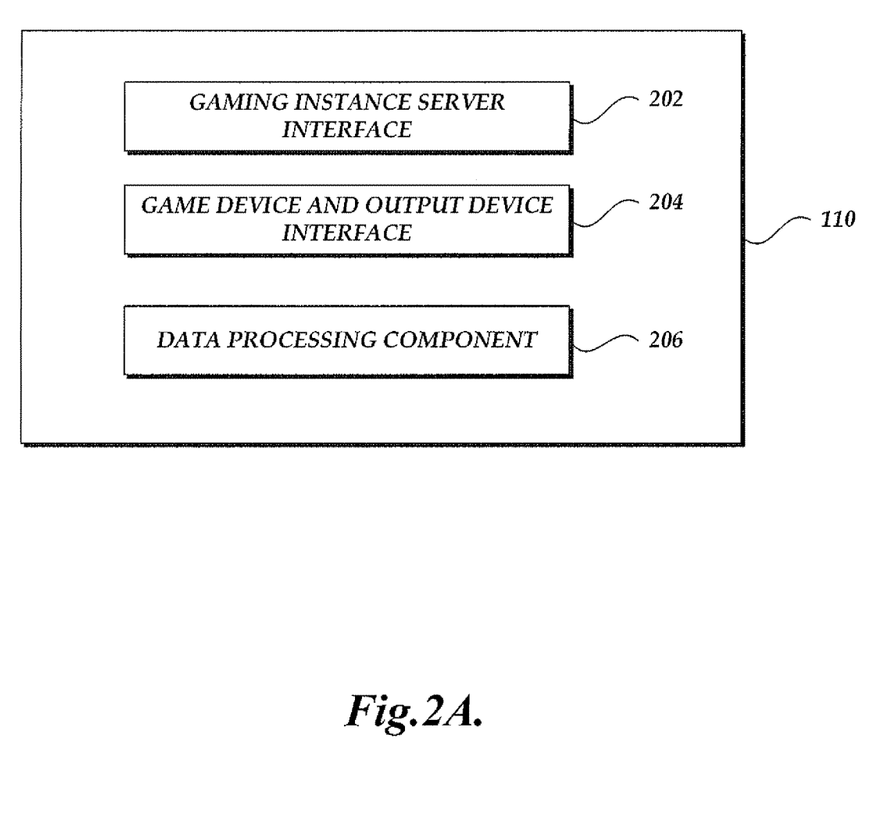
FIG. 2A is a block diagram illustrative of components of a gaming management service.

With reference now to FIG. 2A, a block diagram illustrative of components of the gaming management service 114 will be described. As illustrated in FIG. 2A, the gaming management service 114 can include a gaming instance server interface component 202 for obtaining registration information associated with available gaming servers 112. The gaming instance server interface component 202 can obtain various information identifying the gaming server 112 instances, criteria for determining which gaming server instances may be utilized in conjunction with a connection requests or other information related to the processing of gaming requests by customers. The gaming management service 114 can also include a game device and output device interface component 204 for obtaining registration of gaming devices 102, display devices 104, audio devices 106 and the configuration of game device groups. Additionally, the game device and output device interface component 204 can also obtain criteria determining which configured game device groups may be appropriate. Still further, the gaming device and output device interface component 204 can process requests for instantiation of a game session that can include selection of a gaming server 112 and game device group. The gaming management service 114 can further include a data processing component 206 for facilitating the registration of gaming server 112, game devices 102, display devices 104 and audio devices 106 and the processing requests to establish a gaming session. The components of the gaming management service 114 may be considered to logical components that be executive in various combinations or in accordance with various hardware or software configurations.

Figure 2B:
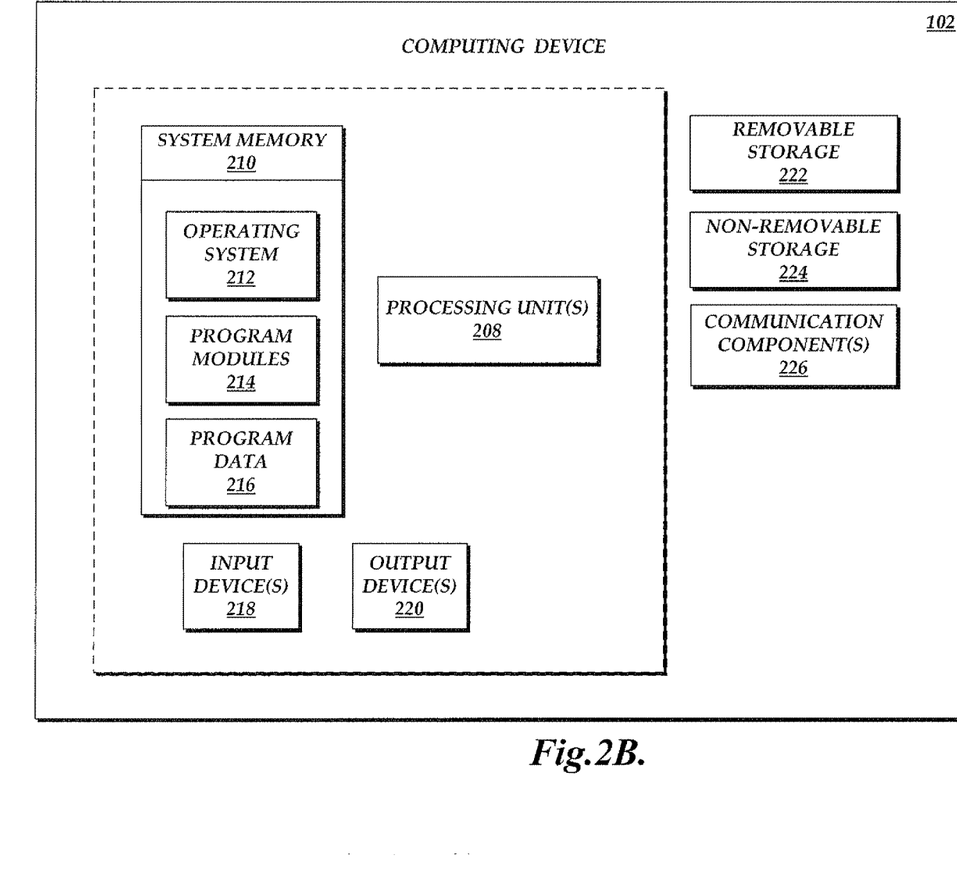
FIG. 2B is a block diagram illustrative of components of a gaming device.

With reference to FIG. 2B, illustrative components of a game device 210 for collecting game device registration information, game device group configuration information or game session input data will be described. The game device 210 may include system memory 210, which may correspond to any combination of volatile or non-volatile storage mechanisms. The system memory 210 may store information that provides an operating system component 212, various program modules 214, program data 216, and/or other components. The game device 210 performs functions by using the processing unit(s) 208 to execute instructions provided by the system memory 210. The game device 210 may also include one or more input devices 218 (keyboard, mouse device, specialized selection keys, joysticks, etc.) and one or more output devices 220 (displays, audio output mechanisms, etc.).

Figure 2C:
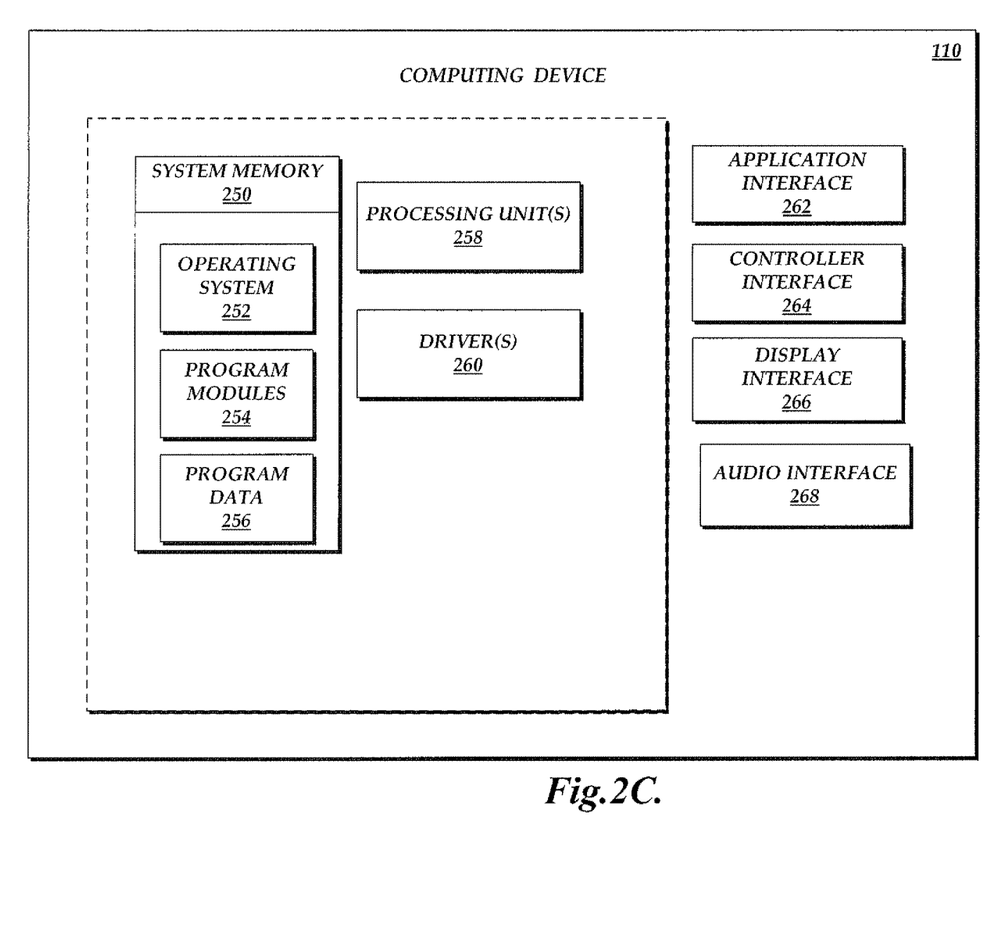
FIG. 2C is a block diagram illustrative of components of a gaming server.

With continued reference to FIG. 2B, the game device 210 may also include one or more types of removable storage 222 and one or more types of non-removable storage 224. Still further, the game device 210 can include communication components 226 for facilitating communication via wired and wireless communication networks, such as the communication network 108 (FIG. 1). The game device 102 may include hardware or software components that are configured specifically to a specific gaming platform, such as a gaming controller associated with a specific gaming console. Alternatively, the game device 102 can correspond to a generic controller or input device not associated with any particular gaming console. Still further, the game device 102 can have hardware or software components that allow the game device 102 to emulate at least aspects of a specific game controller without being limited to such emulation. For example, a game device 102 may have display screen that has representations of virtualized controls emulating physical controls With reference to FIG. 2C, illustrative components of a game server 112 for collecting game session input data from game devices 210, executing software code and generating outputs to display devices 104, audio devices 106 or other output devices will be described. As previously described, the illustrated components of the game server 112 may be hardware components associated with device or virtualized components generated by appropriate hardware or software devices. The game server 112 may include system memory 250, which may correspond to any combination of volatile or non-volatile storage mechanisms. The system memory 250 may store information that provides an operating system component 252, various program modules 254, program data 256, and/or other components. The game server 112 performs functions by using the processing unit(s) 258 to execute instructions provided by the system memory 250. The game server 112 may also include one or more optional input devices 258 (keyboard, etc.) and one or more optional output devices 260 (displays, audio output mechanisms, etc.).

With continued reference to FIG. 2C, the game server 112 may also include one or more application interfaces 262 for communicating with other gaming servers 112 or the gaming management service 114. The game server 112 can also include a controller interface 264 for communicating with the game devices 102 via the communication network, a display interface 266 for communicating with display devices 104 and an audio interface 268 for communicating with audio devices 106. As previously described, the game server 112 can also include additional interfaces for communicating with different output devices. Still further, the game server 112 may include multiple interfaces to communicate with different categories or types of output devices. For example, a game server 112 instances may have multiple audio interface components 268 to facilitate communications in accordance with different types of audio communication protocols. Illustratively, the game server 112 includes the controller interface 264, display interface 266, and audio interface 268 that allows for the independent transmission of input data, video data and audio data. Additionally, the transmission of the data may be accomplished by each controller by utilization of different communication protocols, security protocols or verification techniques without interface with the other transmission of data. For example, audio data may be transmitted utilizing a communication protocol optimized for audio communications, such as for latency, quality, etc. Video data may be transmitted utilizing a communication protocol optimal for security.

Figure 3A:
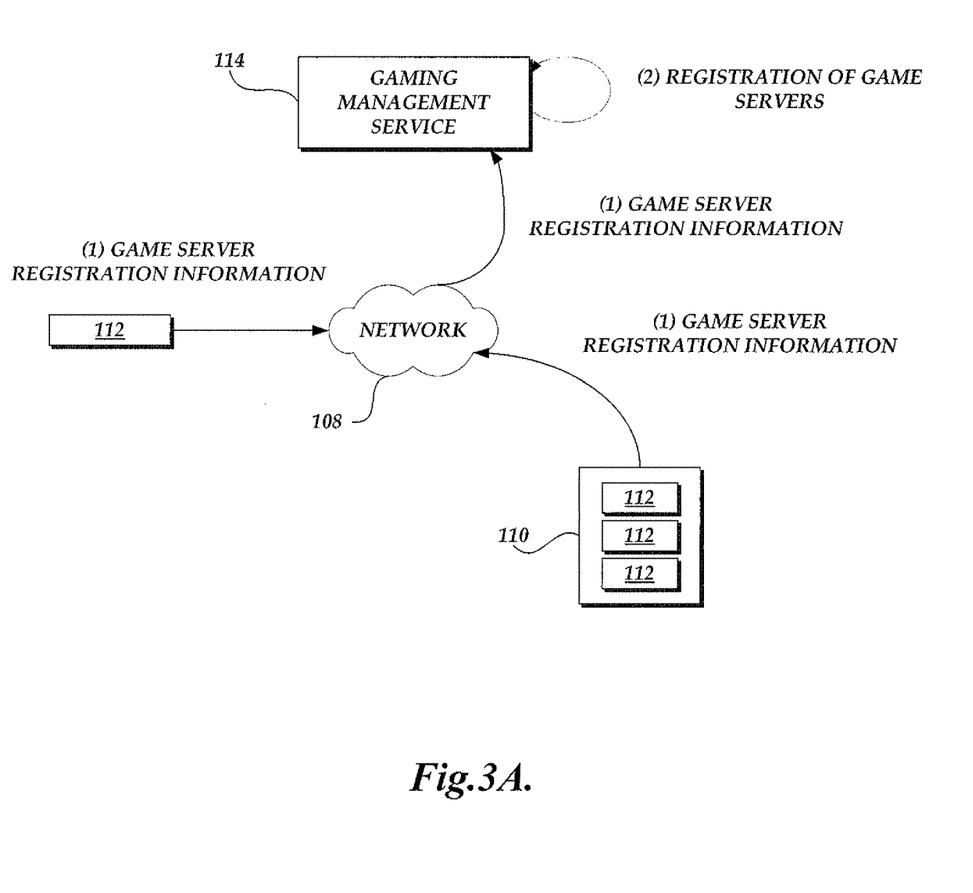
FIGS. 3A and 3B are block diagrams of the gaming environment of FIG. 1 illustrating the registration of gaming servers and gaming device groups.
Figure 3B:
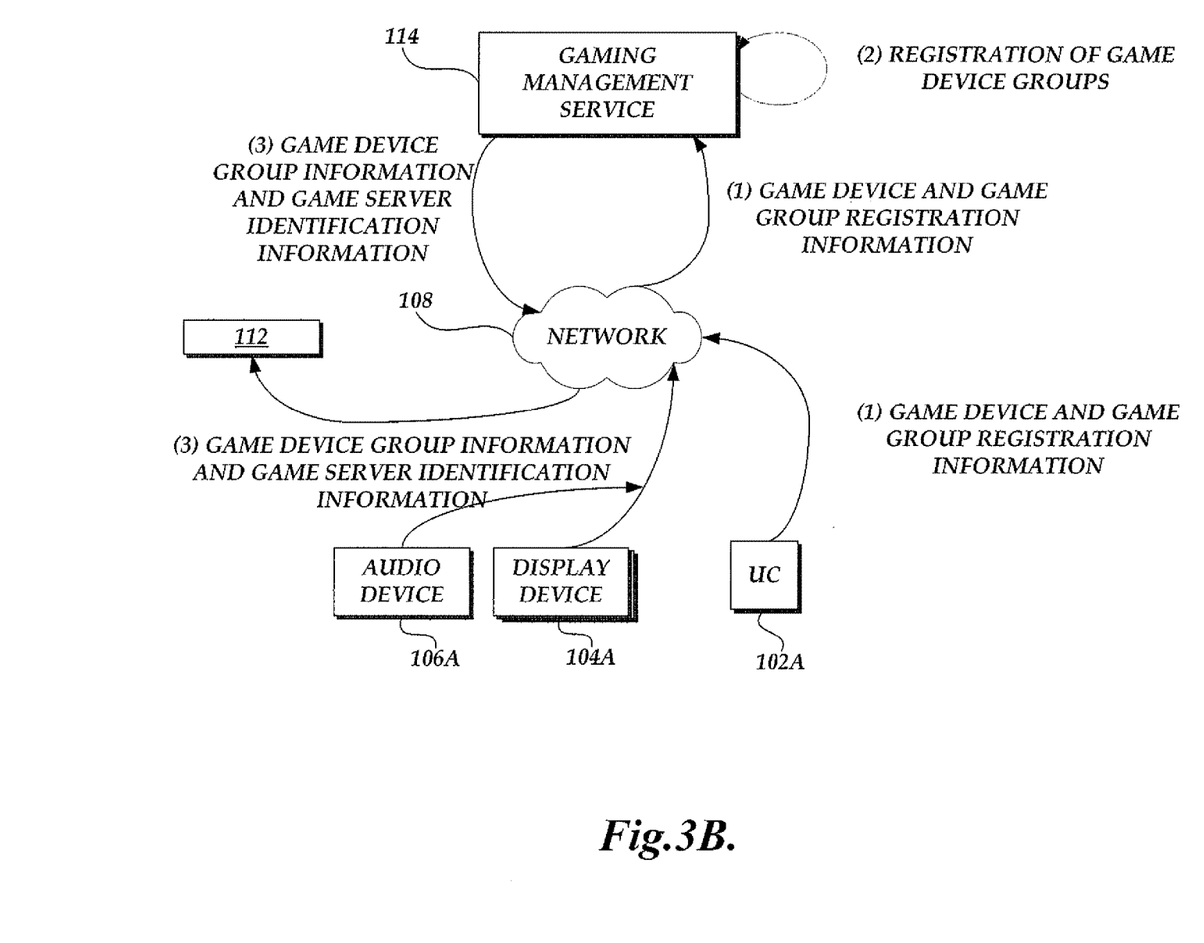
Figure 4A:
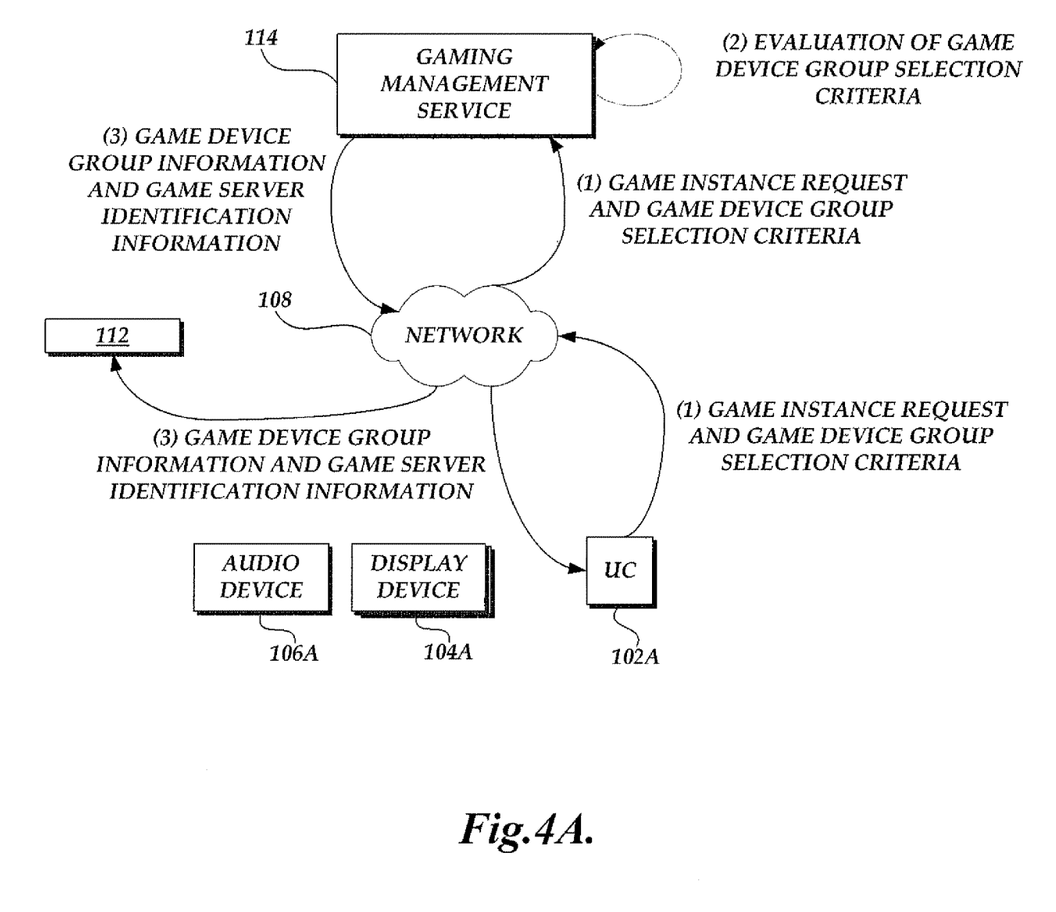
FIGS. 4A-4C are block diagrams of the gaming environment of FIG. 1 illustrating the initiation of a gaming instances with game device groups and the processing of game data.
Figure 4B:
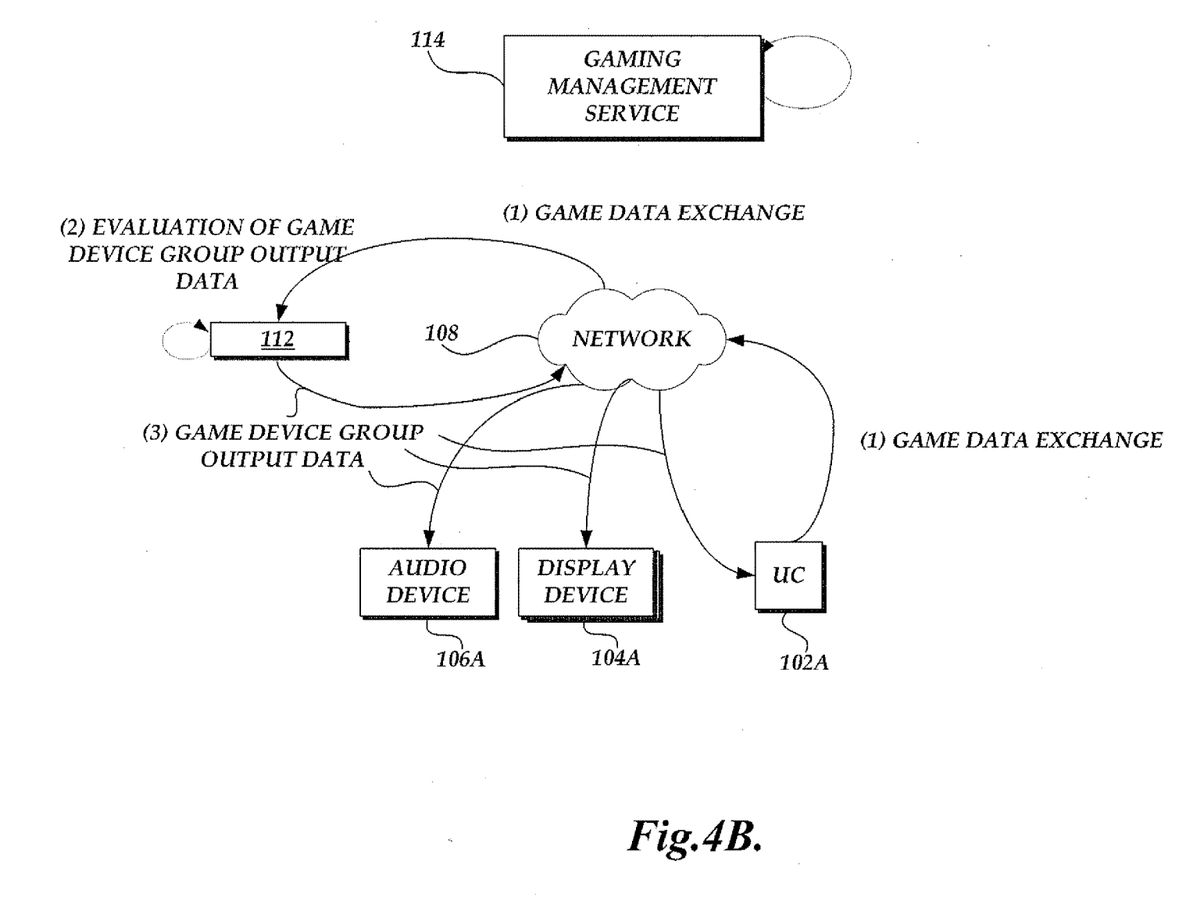
Figure 4C:
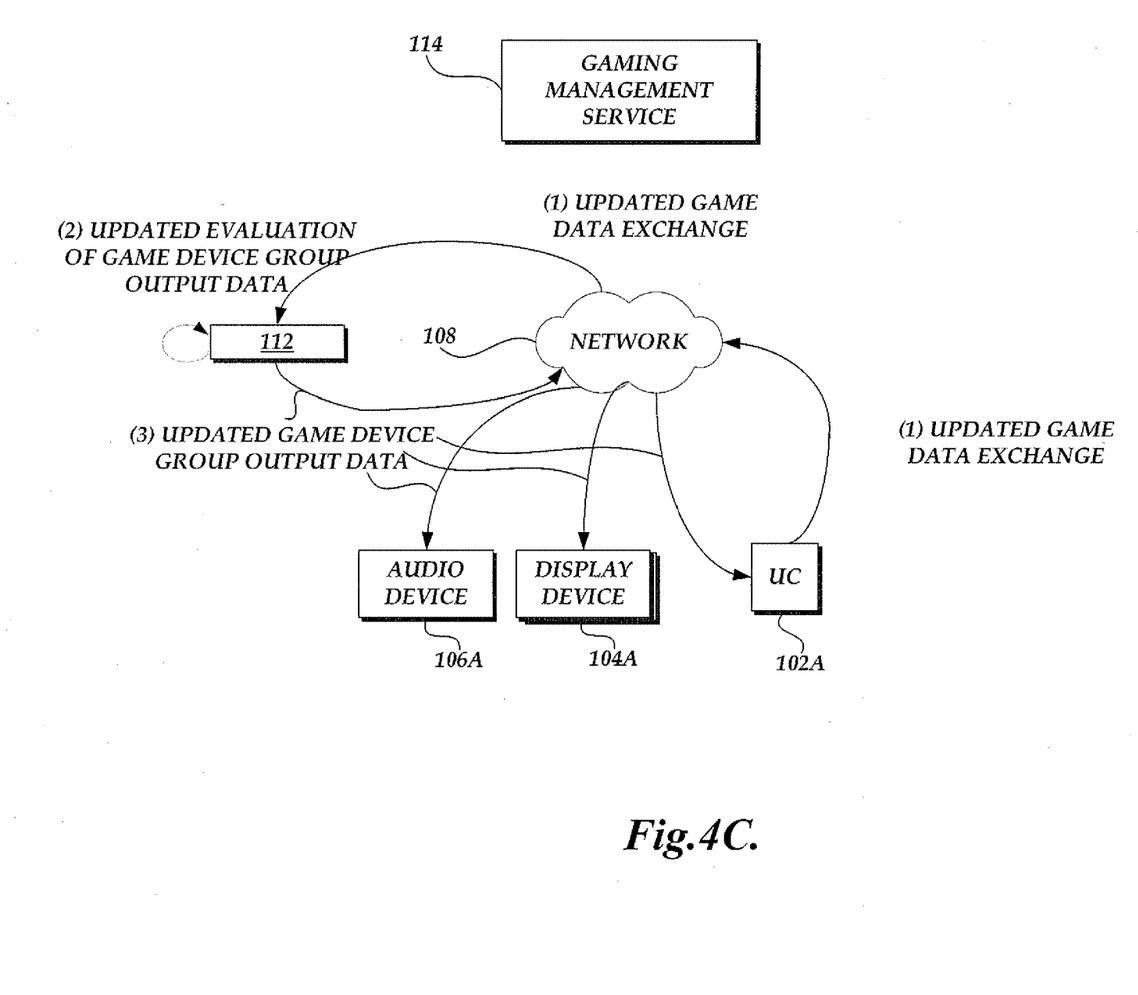

Turning now to FIGS. 3 and 4, various embodiments illustrating the interaction between the components of the gaming environment 100 will be described. For purposes of illustration, however, many of the components and processes involved in the illustrated actions have been simplified and not illustrated. Accordingly, one skilled in the relevant art will appreciated that the embodiments in FIGS. 3 and 4 are illustrative in nature and should not be construed as limiting.

With reference to FIG. 3A, an embodiment for the registration of gaming servers 112 will be described. In this embodiment, one or more gaming servers 112 provide registration information to the gaming management service 114 via the communication network 108. The registration information can include information identifying the particular gaming server, such as unique identifiers, authentication information and the like. Additional the registration information can include information identifying communication preference information such as valid network address information, preferred or supported communication protocols, performance information, current load information, and the like. Still further, the registration information can include information utilized to pair the gaming server to a game device group, such as gaming sessions supported (e.g., which games can be executed), supported game device groups and the like.

In some embodiments, the gaming server 112 registration can corresponds to a class of virtualized gaming servers 114 that can be instantiated upon request. Still further, the registration information can include identifiers or authentication information that allows the gaming management service 114 to locate additional registration information without requiring the retransmission from the gaming server 112. Based on the received information, the gaming management service 114 processes the information for utilization in identifying the gaming server responsive to request to initiate a gaming session.

With reference to FIG. 3B, an embodiment for the registration of game devise 102, display devices 104 and audio devices 106 and the formation/configuration of game groups will be described. As illustrated in FIG. 3B, the game device 102A and display device 104A independent transmit device registration or group registration information. The audio device 106A utilizes the communication network capabilities of the display device 104A to facilitate transmission. Illustratively, the registration of the game devices 102, display devices 104 and audio devices 106 can include the identification of the devices, authentication of the devices to a user or set of users and the specification of communication protocol preferences. For example, an audio device 106 may specify a preferred order of audio protocols to utilize.

In some embodiments, the game device 102 (or other device) may include the configuration of one or more game device groups. In one aspect, the game device groups may be made up of a game device and one or more output devices. In another aspect, a game device group can include a game device 102 that may be associated with multiple display devices 104 and multiple audio devices 106 that form the group. Additionally, in some embodiments, the game device 102 may configure multiple game device groups. In such embodiments, the configuration of the game device groups can include the specification of game device group evaluation criteria that determines which game device group may receive game device output data. For example, the game device group evaluation criteria can specify which game device groups should be active based on location information obtained from the game device 102 (e.g., GPS data, location attribute information (e.g., home router) or other location information).

The game device evaluation criteria can also specify categories of game device groups, such as a low volume configuration, late night configuration, party configuration. The game device group category can be specified in a gaming session request or determined based on external inputs. For example, a gaming server may determine a time of day or use microphone inputs to determine an appropriate game device group. In another example, the game device can include specific controls that allow a user to select from multiple game device group criteria and transmit the selection during a gaming session to the gaming server 112.

The game device group evaluation criteria can further include the specification of specific events or criteria that may be evaluated during a gaming session. In one example, a gaming device group may be automatically changed during a gaming session based on a command issued by the game being executed by the gaming server or achievement of a specific goal, score, event, etc. In another example, a different game device group can include additional display devices such that video data is transmitted to a television if a user achieves a high score or surpasses a defined event/challenge. In a further example, a gaming device group may change based on a determined context of the output being generated by the gaming server, such as mature content, private or confidential content.

With continued reference to FIG. 3B, the registration information is processed by the gaming management service 114. Additionally, at least some portion of the registration or configuration information may be optionally transmitted to one or more gaming servers 112 for utilization in subsequent or current gaming sessions.

Turning now to FIG. 4A, in an illustrative embodiment, a user can instantiate a new gaming session or attempt to connect to a previously instantiated gaming session by transmitting a request via a game device 102 to the gaming management service 114. The request can include various identification information and authentication information utilized to identify one or more users and the requesting game device 102. Additionally, the request can include game device group selection information that specifies a configuration of a game device group. Alternatively, the request can include information that allows the gaming management service 114 to determine one or more appropriate game device groups.

The gaming management service processes the request to identify match a gaming server 112 and game device group. In one embodiment, the gaming management service 114 may utilize location information, latency information, service level information and other network information to identify the gaming server 112 most appropriate for the selected game device group. The selection of the gaming server 112 and configuration of the game device group can then be transmitted to the appropriate gaming server 112, game device 102 and output devices in the determined game device group.

In other embodiments, the request and processing of the gaming session request from the game device 102 may be transmitted directly to a gaming server 112 previously designated by the gaming management service 114 or otherwise previously identified to a game device 102.

Turning now to FIG. 4B, once the gaming server 112 and game device group have been identified, the game device 102A establishes a communication and gaming session with the gaming server 112. The establishment of the communication and gaming session can include the instantiation of an instance of a gaming server 112 if such an instance is not otherwise available. Additionally, the gaming server 112 can establish a communication session with one or more video devices 104 and audio devices 104 associated with the identified game device group.

Thereafter, as part of the gaming session, the gaming server processes inputs transmitted by the game device 102A via the communication network 108 in accordance with the optimization associated with the transmission of inputs to the gaming server 112. The gaming server processes the inputs according the software code of the game being executed by the gaming server 112. The gaming server then transmits output data to each of the output devices, display device 104A and audio device 106 A. The transmission of the audio and video data is independent of the input data and each other, respectively, in accordance with a specified communication protocol (or other protocol).

With reference now to FIG. 4C, as previously described, the selection of the game device group may be modified based on the evaluation of the game device group criteria during a gaming session. In this embodiment, as illustrated in FIG. 4C, the game device 102 provides updated game session inputs via the established protocols for transmitting inputs. The gaming server processes the inputs according the software code of the game being executed by the gaming server 112. Additionally, the gaming server 112 can then determine whether the updated inputs results in a modification of which game device group may be applicable. For example, the gaming server 112 can determine whether a command to switch game device groups was generated by the software code or transmitted by the game device 102A. If so, the gaming server 112 can establish a communication session with one or more video devices 104 and audio devices 104 associated with the updated game device group. The gaming server then transmits output data to each of the output devices, display device 104A and audio device 106 A. The transmission of the audio and video data is independent of the input data and each other, respectively, in accordance with a specified communication protocol (or other protocol).

Figure 5:
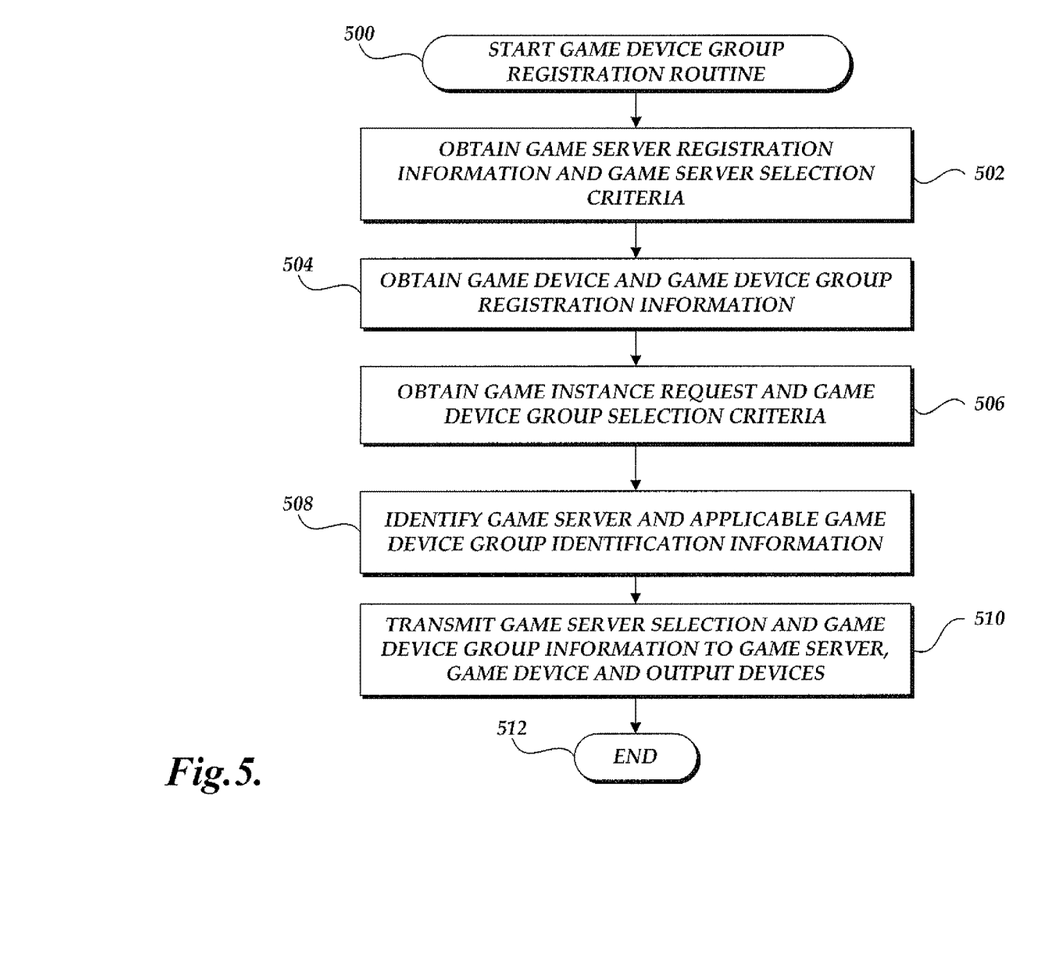
FIG. 5 is a flow diagram illustrative of a game device group registration routine implemented a gaming management service.

Turning now to FIG. 5, a flow diagram illustrative of a routine 500 for processing game device group information will be described. Routine 500 may be illustrative implemented by the gaming management service 114, a gaming server 112, other device or combination thereof. For purposes of illustration, however, routine 500 will be described with regard to the gaming management service 114.

At block 502, the gaming management service 114 obtain game server registration information and game server selection criteria. As previously discussed, the registration information can include information identifying the particular gaming server, such as unique identifiers, authentication information and the like. Additional the registration information can include information identifying communication preference information such as valid network address information, preferred or supported communication protocols, performance information, current load information, and the like. Still further, the registration information can include information utilized to pair the gaming server to a game device group, such as gaming sessions supported (e.g., which games can be executed), supported game device groups and the like.

In some embodiments, the registration information can include identifiers or authentication information that allows the gaming management service 114 to locate additional registration information without requiring the retransmission from the gaming server 112. Based on the received information, the gaming management service 114 processes the information for utilization in identifying the gaming server responsive to request to initiate a gaming session.

At block 504, the gaming management service 114 obtains game device and game device group information. As previously described, the registration of the game devices 102, display devices 104 and audio devices 106 can include the identification of the devices, authentication of the devices to a user or set of users and the specification of communication protocol preferences.

In some embodiments, the game device 102 (or other device) may include the configuration of one or more game device groups. The game device groups may be made up of a game device and one or more output devices. A game device 102 may also be associated with multiple display devices 104 and multiple audio devices 106 that form the group. Additionally, in some embodiments, the game device 102 may configure multiple game device groups. In such embodiments, the configuration of the game device groups can include the specification of game device group evaluation criteria that determines which game device group may receive game device output data. For example, the game device group evaluation criteria can specify which game device groups should be active based on location information obtained from the game device 102 (e.g., GPS data, location attribute information (e.g., home router) or other location information).

The game device evaluation criteria can also specify categories of game device groups, such as a low volume configuration, late night configuration, party configuration. The game device group category can be specified in a gaming session request or determined based on external inputs. For example, a gaming server may determine a time of day or use microphone inputs to determine an appropriate game device group. In another example, the game device can include specific controls that allow a user to select from multiple game device group criteria and transmit the selection during a gaming session to the gaming server 112.

The game device group evaluation criteria can further include the specification of specific events or criteria that may be evaluated during a gaming session. In one example, a gaming device group may be automatically changed during a gaming session based on a command issued by the game being executed by the gaming server or achievement of a specific goal, score, event, etc. In another example, a different game device group can include additional display devices such that video data is transmitted to a television if a user achieves a high score or surpasses a defined event/ challenge. In a further example, a gaming device group may change based on a determined context of the output being generated by the gaming server, such as mature content, private or confidential content At block 506, the gaming management service 114 obtains a request for instantiation of a gaming session and game device group selection information. As previously described, the request can include various identification information and authentication information utilized to identify one or more users and the requesting game device 102. Additionally, the request can include game device group selection information that specifies a configuration of a game device group. Alternatively, the request can include information that allows the gaming management service 114 to determine one or more appropriate game device groups. At block 508, the gaming management service 114 processes the gaming session request and identifies an applicable gaming server 112 and one or more applicable game device groups. At block 510, the gaming management service 114 transmits the selection of the gaming server and game device group in response to the request. At block 510, the routine terminates.

Figure 6:
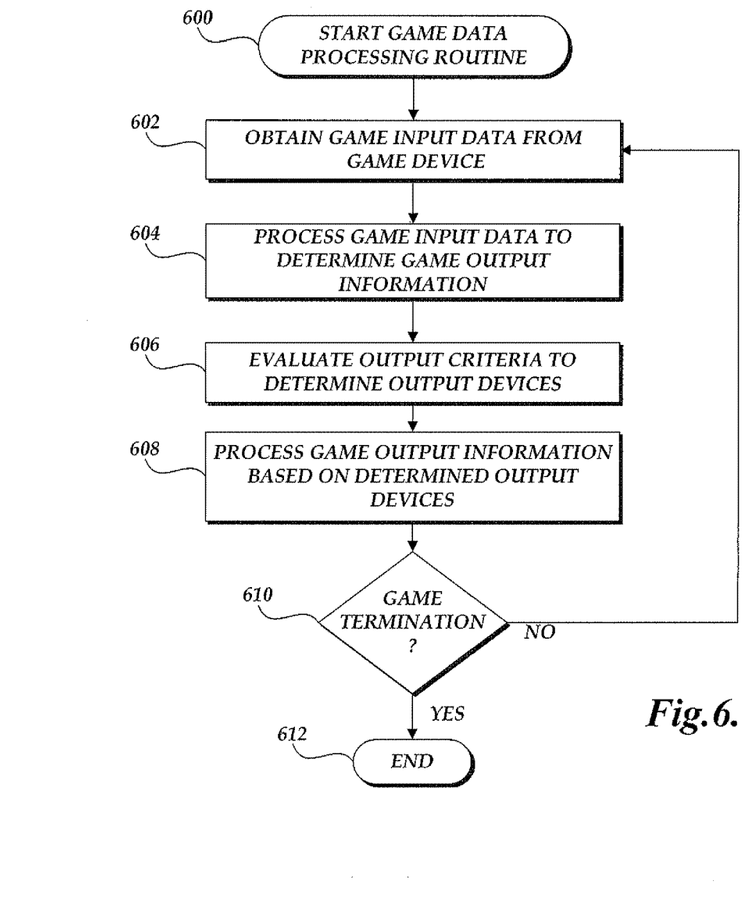
FIG. 6 is a flow diagram illustrative of a game data processing routine.

Turning now to FIG. 6, a routine 600 to process gaming data will be described. Illustratively, routine 600 is illustrative implemented by a gaming server 112 as part of a gaming session with a game device group. Alternatively, some aspect of routine 600 may be implemented by the gaming management service. At block 602, the gaming server obtains game input data from the game device 102. Illustratively, the communications between the game device 102 and the gaming server are transmitted via the communication network 108 in accordance with the optimization associated with the transmission of inputs to the gaming server 112.

At block 604, the gaming server 112 processes the inputs according the software code of the game being executed by the gaming server 112. The gaming server then transmits output data to each of the output devices, display device 104A and audio device 106 A. The transmission of the audio and video data is independent of the input data and each other, respectively, in accordance with a specified communication protocol (or other protocol). At block 606, the gaming server determines whether the processed inputs results in a modification of which game device group may be applicable or otherwise determines the applicable output devices. For example, the gaming server 112 can determine whether a command to switch game device groups was generated by the software code or transmitted by the game device 102A.

At block 608, the gaming server 114, the gaming server 112 can establish a communication session with one or more video devices 104 and audio devices 104 associated with the updated game device group (if not previously accomplished) and transmits output data to each of the output devices, such as display devices 104 and audio devices 106 The transmission of the audio and video data is independent of the input data and each other, respectively, in accordance with a specified communication protocol (or other protocol).

At decision block 610, the gaming server 114 determines whether the gaming session has been terminated. If not, the routine 600 returns to block 602 to process further input from the game device 102. Alternatively, the routine 600 terminates at block 612.

It will be appreciated by those skilled in the art and others that all of the functions described in this disclosure may be embodied in software executed by one or more processors of the disclosed components and mobile communication devices. The software may be persistently stored in any type of non-volatile storage.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art. It will further be appreciated that the data and/or components described above may be stored on a computer-readable medium and loaded into memory of the computing device using a drive mechanism associated with a computer readable storing the computer executable components such as a CD-ROM, DVD-ROM, or network interface further, the component and/or data can be included in a single device or distributed in any manner. Accordingly, general purpose computing devices may be configured to implement the processes, algorithms and methodology of the present disclosure with the processing and/or execution of the various data and/or components described above.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system for implementing a gaming session comprising:
    one or more gaming controllers, wherein the one or more gaming controllers include at least one wireless network communication component; and
    a game management component implemented in a computing system associated with at least one processor and memory, the gaming management component operative to:
        obtain a request to initiate a gaming session, the request to initiate the gaming session independently identifying at least one user, a game, an output device, and a gaming controller;
        process the request to initiate the gaming session;

determine a first protocol associated with the output device based at least in part on the information independently identifying the output device;

determine a second protocol associated with the gaming controller based at least in part on the information independently identifying the gaming controller; and cause the instantiation of a gaming session instance corresponding to the request, the gaming session instance executed by a network-based computing device having at least one input port to receive game control information from the identified gaming controller using the second protocol and at least one output port for transmitting gaming data to the identified output device using the first protocol.

2. The system as recited in claim 1, wherein the one or more gaming controllers are operative to wirelessly receive gaming session information associated with the instantiated gaming session using the wireless network communication component.

3. The system as recited in claim 1, wherein at least one gaming controller of the one or more gaming controllers includes a display device.

4. The system as recited in claim 1, wherein at least one gaming controller of the one or more gaming controllers includes an input device for obtaining registration information.

5. The system as recited in claim 1, wherein at least one gaming controller of the one or more gaming controllers is operative to transmit at least a portion of the request to initiate the gaming session.

6. The system as recited in claim 5, wherein the at least one gaming controller is operative to transmit an identification of a gaming controller.

7. The system as recited in claim 5, wherein the at least one gaming controller is operative to transmit an identification of a user.

8. The system as recited in claim 5, wherein the at least one gaming controller is operative to transmit an identification of an output device.

9. The system as recited in claim 1, wherein at least one gaming controller of the one or more gaming controllers includes one or more memory components for maintain information related to gaming sessions.

10. The system as recited in claim 9, wherein the at least one gaming controller maintains authentication information related to one or more users in the one or more memory components.

11. The system as recited in claim 9, wherein the at least one gaming controller maintains gaming progress information related to one or more gaming session in the one or more memory components.

12. The system as recited in claim 1 further comprising one or more computing devices for hosting gaming session instances.

* * * * *